United States Patent
Keating

(10) Patent No.: US 9,850,834 B2
(45) Date of Patent: Dec. 26, 2017

(54) TURBOCHARGED ENGINE EMPLOYING CYLINDER DEACTIVATION

(71) Applicant: GM GLOBAL TECHNOLOGY OPERATIONS LLC, Detroit, MI (US)

(72) Inventor: Edward J. Keating, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 105 days.

(21) Appl. No.: 15/007,696

(22) Filed: Jan. 27, 2016

(65) Prior Publication Data

US 2016/0138501 A1 May 19, 2016

Related U.S. Application Data

(63) Continuation-in-part of application No. 13/905,435, filed on May 30, 2013, now abandoned.

(51) Int. Cl.
*F02B 33/44* (2006.01)
*F02D 13/06* (2006.01)
(Continued)

(52) U.S. Cl.
CPC ......... *F02D 41/0087* (2013.01); *F01D 9/026* (2013.01); *F02B 37/007* (2013.01); *F02B 37/025* (2013.01); *F02D 13/06* (2013.01); *F02D 23/02* (2013.01); *F02D 41/0007* (2013.01); *F02B 37/22* (2013.01);
(Continued)

(58) Field of Classification Search
CPC ...... F01D 9/026; F02D 41/0087; F02D 13/06; F02D 23/02; F02D 41/0007; F02D 2041/0012; F02B 37/007; F02B 37/013; F02B 37/025; F05D 2220/40; Y02T 10/144
USPC ..... 60/605.1, 612; 123/198 F, 562; 415/204, 415/205, 206, 98, 102
See application file for complete search history.

(56) References Cited

U.S. PATENT DOCUMENTS 6,651,431 B1 * 11/2003 Yang ........................ F01D 9/026
60/605.1
6,786,190 B2 * 9/2004 Wu ........................... F02D 17/02
123/198 F
(Continued)

FOREIGN PATENT DOCUMENTS

CN 101532436 A 9/2009
DE 60125707 T2 5/2007
(Continued)

*Primary Examiner* — Thai Ba Trieu
(74) *Attorney, Agent, or Firm* — Quinn IP Law

(57) ABSTRACT

A method of operating a gasoline engine having a first subset of cylinders and a second subset of cylinders includes providing a flow of compressed air from a single-sequential compressor to the engine, selectively deactivating the first subset of cylinders, and igniting gasoline mixed with the compressed air in the second subset of cylinders. The single-sequential compressor includes a dual sided impeller having a first blade arrangement in fluid communication with a first air inlet, and an opposing second blade arrangement in fluid communication with a second air inlet. Additionally, deactivating the first subset of cylinders includes sealing the first subset of cylinders such that the flow of compressed air is provided only to the second subset of cylinders.

5 Claims, 4 Drawing Sheets

(51) Int. Cl.
    *F02D 17/02*    (2006.01)
    *F02B 33/00*    (2006.01)
    *F01D 3/02*     (2006.01)
    *F04D 29/44*    (2006.01)
    *F04D 29/54*    (2006.01)
    *F02D 41/00*    (2006.01)
    *F01D 9/02*     (2006.01)
    *F02B 37/02*    (2006.01)
    *F02B 37/007*   (2006.01)
    *F02D 23/02*    (2006.01)
    *F02B 37/22*    (2006.01)

(52) U.S. Cl.
    CPC .. *F02D 2041/0012* (2013.01); *F05D 2220/40* (2013.01); *Y02T 10/144* (2013.01)

(56) References Cited

U.S. PATENT DOCUMENTS

| | | | |
|---|---|---|---|
| 7,305,827 B2 * | 12/2007 | Arnold | F01D 9/026 60/605.1 |
| 2007/0074513 A1 * | 4/2007 | Lamb | F02B 37/013 60/612 |
| 2010/0037601 A1 | 2/2010 | Pierpont | |
| 2011/0000459 A1 * | 1/2011 | Elsa er | F02M 26/24 123/198 F |

FOREIGN PATENT DOCUMENTS

| | | | | |
|---|---|---|---|---|
| DE | 102008055896 A1 | 5/2010 | | |
| JP | 2005291019 A | * 10/2005 | ............ | F02D 17/02 |
| JP | 2005291020 A | * 10/2005 | ............ | F02D 17/02 |

\* cited by examiner

— 1 —

TURBOCHARGED ENGINE EMPLOYING CYLINDER DEACTIVATION

CROSS REFERENCE TO RELATED APPLICATIONS

This application is a continuation-in-part of and claims the benefit of priority from U.S. application Ser. No. 13/905,435, filed May 30, 2013, which is hereby incorporated by reference in its entirety.

TECHNICAL FIELD

The present invention relates generally to a turbocharged engine employing cylinder deactivation.

BACKGROUND

Internal combustion engines (ICE) may combust a mixture of air and fuel within one or more combustion chambers to produce a mechanical output. During the combustion, various exhaust gases are produced and expelled to the atmosphere. In some instances, one or more cylinders may be deactivated to eliminate the need to combust unnecessary amounts of fuel when a small amount of torque is requested (i.e., "cylinder deactivation"). Cylinder deactivation typically involves forcing the valves to the cylinders to remain in a closed state, which turns the trapped (fuel-less) air into a gas-spring. Doing so allows the required power to be produced with reduced throttling losses.

Internal combustion engines are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger includes a central shaft that is supported by one or more bearings and that transmits rotational motion between an exhaust-driven turbine wheel and an air compressor wheel. Both the turbine and compressor wheels are fixed to the shaft, which in combination with various bearing components constitute the turbocharger's rotating assembly.

SUMMARY

An engine assembly includes an intake assembly, a spark-ignited internal combustion engine, an exhaust assembly, and a turbocharger. The internal combustion engine is coupled with the intake assembly and defines both a first plurality of cylinders and a second plurality of cylinders. The exhaust assembly includes a first exhaust manifold in fluid communication with the first plurality of cylinders and a second exhaust manifold in fluid communication with the second plurality of cylinders.

The turbocharger includes a dual-inlet compressor in fluid communication with the intake assembly, and a dual-scroll turbine in fluid communication with the exhaust assembly. The dual-inlet compressor and dual-scroll turbine are operatively connected through a shaft, and the spark-ignited internal combustion engine is configured to selectively operate in a cylinder deactivation mode where fuel is combusted only in the first plurality of cylinders.

The dual-scroll turbine includes a housing, and turbine wheel disposed within the housing. The housing defines both a first scroll and a second scroll, wherein both the first scroll and the second scroll are circumferentially disposed around a portion of the turbine wheel, and are in fluid communication with the turbine wheel. The first scroll is in fluid communication with the first exhaust manifold, and the second scroll is in fluid communication with the second exhaust manifold.

The dual-inlet compressor includes a compressor housing and a dual-sided impeller disposed within the compressor housing. The compressor housing defines a first inlet, a second inlet, and an outlet, with the outlet being in direct communication with the intake assembly. The dual-sided impeller includes a first blade arrangement on a first side of the impeller, and a second blade arrangement disposed on a second side of the impeller. The compressor housing defines a first flow path between the first inlet and the first blade arrangement of the impeller, and a second flow path between the second inlet and the second blade arrangement of the impeller.

The dual-inlet compressor is configured to provide a compressed supply of air through the intake assembly and to only the first plurality of cylinders when the spark-ignited internal combustion engine is operating in the cylinder deactivation mode. The supplied compressed air may have a pressure greater than atmospheric pressure.

Additionally, a method of operating a gasoline engine having a first subset of cylinders and a second subset of cylinders includes providing a flow of compressed air from a single-sequential compressor to the engine, selectively deactivating the first subset of cylinders, and igniting gasoline mixed with the compressed air in the second subset of cylinders. Additionally, deactivating the first subset of cylinders includes sealing the first subset of cylinders such that the flow of compressed air is provided only to the second subset of cylinders.

The above features and advantages and other features and advantages of the present invention are readily apparent from the following detailed description of the best modes for carrying out the invention when taken in connection with the accompanying drawings.

DETAILED DESCRIPTION

Figure 1:
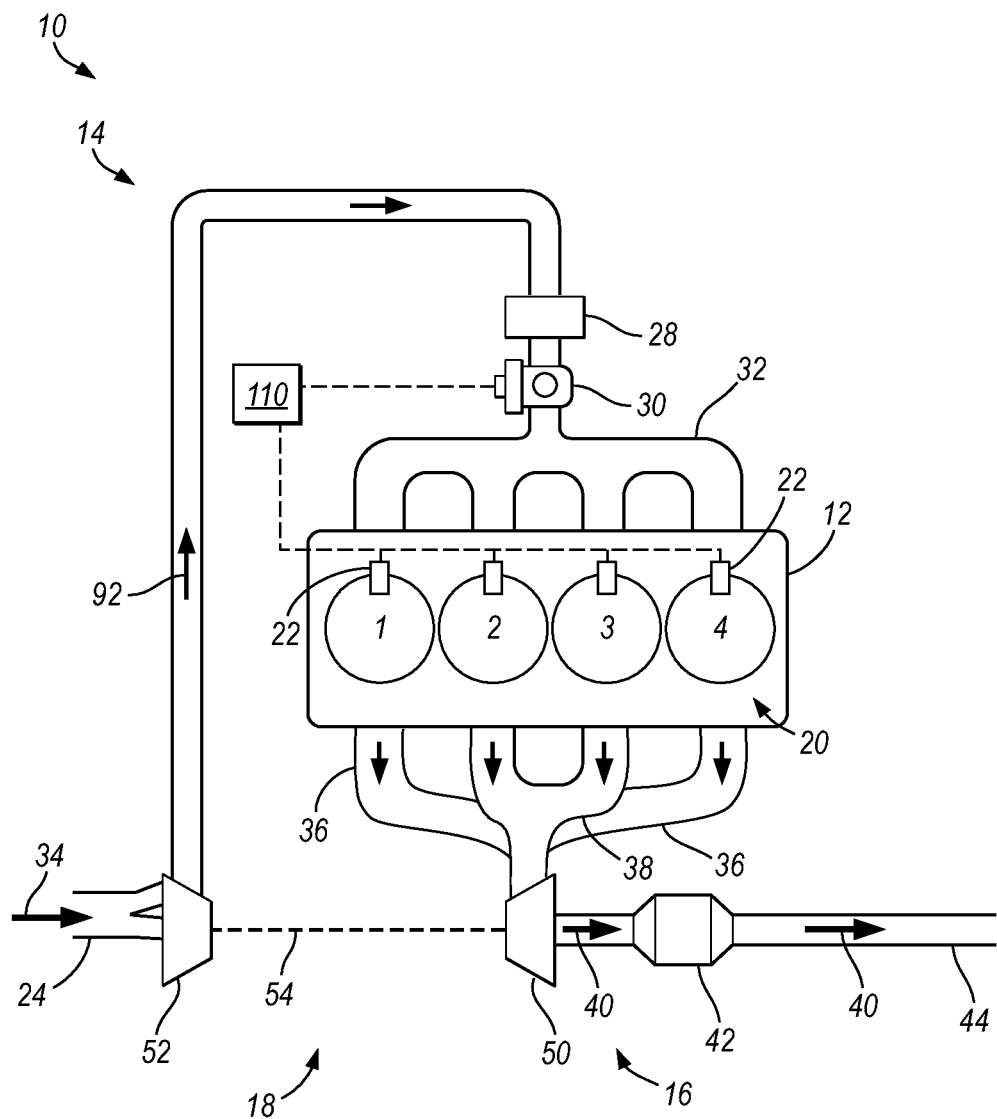
FIG. 1 is a schematic diagram of a turbocharged internal combustion engine assembly.

Referring to the drawings, wherein like reference numerals are used to identify like or identical components in the various views, FIG. 1 schematically illustrates an engine assembly 10 including an internal combustion engine 12, an air intake system 14, and an exhaust system 16. The air intake system 14 and the exhaust system 16 may each respectively be in fluid communication with the engine 12, and may be in mechanical communication with each other through a turbocharger 18.

The internal combustion engine 12 (i.e., engine 12) may be a spark-ignited internal combustion engine and may define a plurality of cylinders 20 (referenced as cylinders 1-4). Each of the respective cylinders 20 may include one or more fuel injectors 22 that may selectively introduce liquid fuel (as an aerosol) into each cylinder for combustion. Each of the cylinders 20 may be in selective fluid communication with the air intake system 14 to receive fresh/oxygenated air, and several of the cylinders 20 may be in selective fluid communication with the exhaust system 16 to expel the byproducts of combustion. While the illustrated engine 12 depicts a 4-cylinder engine, the present technology is equally applicable to inline three and six cylinder engines, V-8, V-10, and V-12 configuration engines, among others.

The air intake system 14 may generally include a fresh-air inlet 24, a charge air cooler 28, a throttle 30, and an intake manifold 32. As may be appreciated during operation of the engine 12 fresh air 34 may be ingested by the air intake system 14 from the atmosphere (or from an associated air-cleaner assembly) via the fresh-air inlet 24. The throttle 30 may include a controllable baffle configured to selectively regulate the total flow of air through the intake system 14, and ultimately into the cylinders 20 (via the intake manifold 32).

In a typical 4-cylinder engine, combustion in the various engine cylinders 20 may occur in a sequential manner. For example, the firing order may sequentially be: cylinder 1; cylinder 3; cylinder 4; cylinder 2. As may be appreciated, the engine 12 may then expel gas from the cylinders in the same sequential order; and thus, the exhaust flow may more closely resemble a series of pulses than a continuous flow.

It has been found that engine efficiency is maximized when exhaust pulses are separated so as not to interfere with each other. In addition to reducing interference between the pulses, the separation may reduce the occurrence of knocking and/or abnormal combustion. In an effort to achieve sufficient pulse separation, the exhaust flow may be divided into different flows, which may be separately routed to the turbocharger 18 via multiple exhaust manifolds. Therefore, in one configuration, the exhaust system 16 may include a first exhaust manifold 36 and a second exhaust manifold 38 that may channel flowing exhaust gasses 40 away from the engine 12. The exhaust gasses 40 may eventually pass through an aftertreatment device 42 to catalyze and/or remove certain byproducts prior to exiting the exhaust system 16 via a tailpipe 44.

As mentioned above, the air intake system 14 and the exhaust system 16 may be in mechanical communication through a turbocharger 18. The turbocharger 18 may include a turbine 50 in fluid communication with the exhaust system 16 and a compressor 52 in fluid communication with the intake system 14. The turbine 50 and the compressor 52 may be mechanically coupled via a rotatable shaft 54. The turbocharger 18 may utilize the energy of exhaust gasses 40 flowing from the engine 12 to spin the turbine 50 and compressor 52. The rotation of the compressor 52 may then draw fresh air 34 in from the inlet 24 and compress it into the remainder of the intake system 14.

Figure 2:
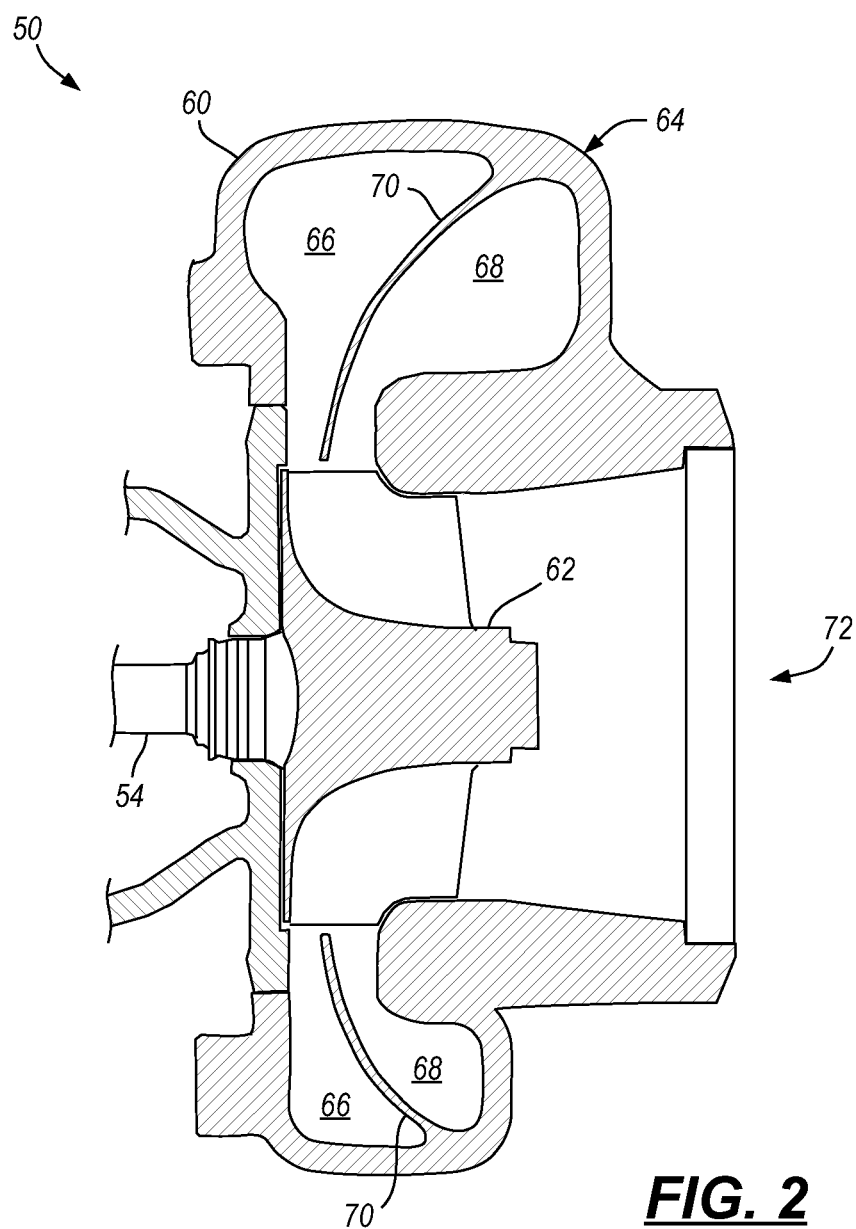
FIG. 2 is a schematic cross-sectional view of a dual-scroll turbine that may be used with the internal combustion engine assembly of FIG. 1.

FIG. 2 illustrates one embodiment of a turbine 50. As shown, the turbine 50 includes a housing 60 and a rotatable turbine wheel 62 that is operatively connected to the rotatable shaft 54. The housing may define a volute portion 64 that generally surrounds the turbine wheel 62, and which is in direct fluid communication with the exhaust system 16. As shown, the volute portion 64 may include a first scroll 66 and a second scroll 68, separated by a partition 70 (thus the housing 60 may be referred to as a "dual-scroll housing 60"). In an exhaust system with two exhaust manifolds 36, 38, each scroll 66, 68 may receive exhaust gasses 40 from one of the respective manifolds. For example, the first scroll 66 may be in fluid communication with the first exhaust manifold 36, and the second scroll 68 may be in fluid communication with the second exhaust manifold 38. Each scroll may direct the flowing exhaust gasses 40 toward the turbine wheel 62, where they may urge the wheel 62 to rotate prior to exiting the turbine 50 via an outlet 72.

Figure 3:
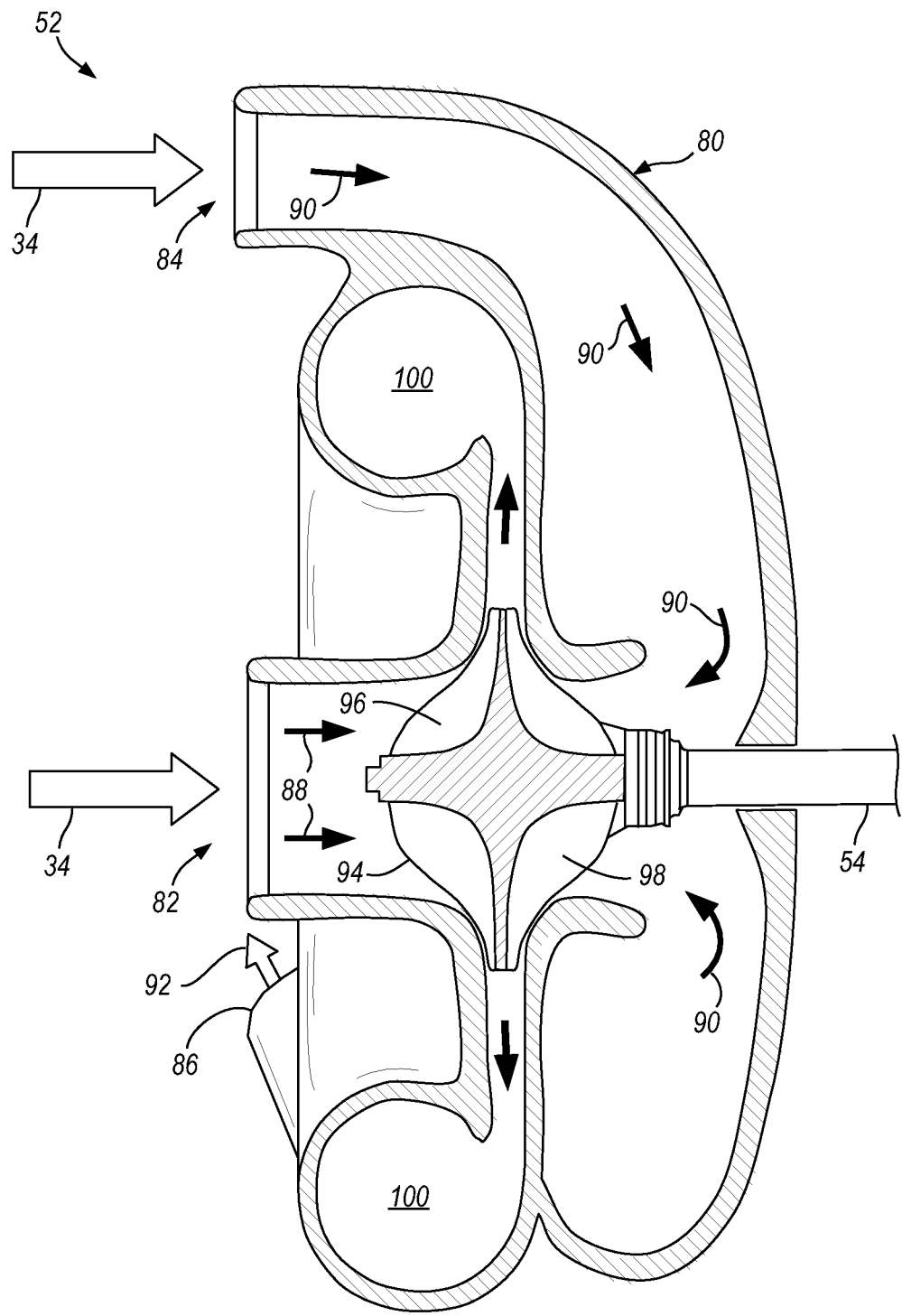
FIG. 3 is a schematic cross-sectional view of a dual-inlet compressor that may be used with the internal combustion engine assembly of FIG. 1.

FIG. 3 illustrates one embodiment of a compressor 52 that may be used with the present system. The illustrated compressor 52 is an example of a sequential compressor that is contained within a single housing 80 (referred to as a "single-sequential compressor 52" for short). The housing may define a first inlet 82, a second inlet 84, and an outlet 86, with each inlet 82, 84 being operatively coupled to the fresh-air inlet 24 of the intake system 14, and the outlet 86 being operatively coupled to the charge-air cooler 28. Each inlet 82, 84 may receive a respective inlet flow 88, 90 that may be a subset of the ingested fresh air 34, and the outlet 86 may expel a flow of compressed air 92 to the charge-air cooler 28.

A dual-sided impeller 94 may be disposed within the housing 80 and fluidly positioned between each of the respective inlets 82, 84, and the outlet 86. The dual-sided impeller 94 may include a first blade arrangement 96 in fluid communication with the first inlet flow 88, and an opposing second blade arrangement 98 in fluid communication with the second inlet flow 90. When the impeller 94 is spun by the rotatable shaft 54 (which is driven by the turbine 50), it may compress air from the first and second inlet flows 88, 90 into a volute passageway 100 disposed around the impeller 94 and open to the outlet 86.

The dual-sided impeller 94 may enable the compressor 52 to achieve the required low flow compression/boost pressure levels that may have caused more traditional (single-sided) compressors to stall and/or surge. This characteristic is beneficial in engines that employ cylinder deactivation, as the overall engine airflow requirement remains similar when one or more cylinders stop ingesting air but the boost pressure requirement increases to produce this required airflow with a reduced number of active cylinders. In this manner, the compressor may provide a compressed supply of air through the intake assembly and to only the active cylinders when the spark-ignited internal combustion engine is operating in the cylinder deactivation mode. This compressed supply of air may generally have a pressure greater than the fresh air intake 34, which may be substantially at atmospheric pressure.

Figure 4:
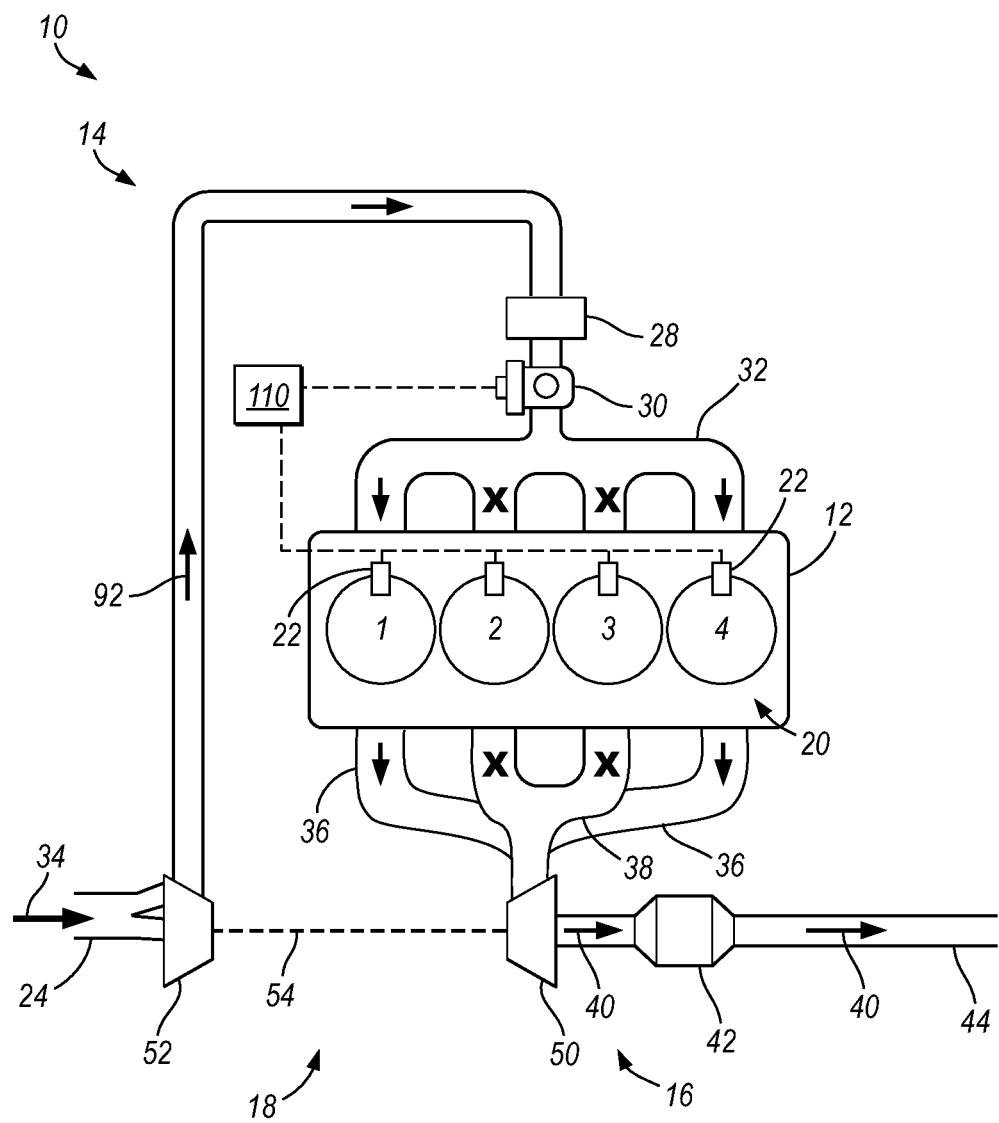
FIG. 4 is a schematic diagram of a turbocharged internal combustion engine assembly, in a cylinder-deactivation mode.

FIG. 4 illustrates the engine assembly 10 of FIG. 1 where cylinders 2 and 3 of the engine 12 have been deactivated (the "X" designating a lack of airflow). As mentioned above, when a cylinder is deactivated, the intake and exhaust valves for the cylinder remain closed throughout the duration of the engine cycle. In this manner, the air that may be trapped/contained within the cylinder acts as a gas-spring, though produces no net work output. In the example provided in FIG. 4, upon deactivation of cylinders 2 and 3, the total air flow through the engine 12 may be reduced by approximately 50%.

The cylinders may be deactivated at the command of a controller 110 that may employ one or more digital processing devices, memory, and control routines. In one configuration, the controller 110 may deactivate cylinders sharing a common exhaust manifold before it deactivates those on a different manifold. As such, the combustion/exhaust pulses occurring in the remaining active cylinders may continue to be spaced as far apart as possible, while a minimum flow rate through the operational manifold (i.e., the first manifold 36) may be ensured.

The design of the above-described turbocharger 18 may be particularly beneficial when combined with an engine using selective cylinder deactivation. Using a dual-scroll turbine 50 while attempting to maximize flow through at least one of the scrolls 66, 68 (i.e., by only deactivating cylinders 20 on a common manifold) may maximize the power that may be captured from the exhaust flow 40, even under low-flow conditions. Moreover, the geometry of the turbine wheel 62 may be tuned to account for low-flow scenarios where exhaust gasses 40 are flowing through only one of the scrolls 66, 68. Additionally, as mentioned above, the dual-inlet compressor 52 with a dual-sided impeller 94 may be capable of providing the required increased amount of compression/boost pressure to produce the required engine air-flow rate (as would occur during cylinder deactivation).

Therefore, in the design illustrated in FIG. 4, the engine assembly 10 includes an engine 12 that is configured to combust a fuel and produce byproduct exhaust gasses 40. A first subset of engine cylinders (e.g., cylinders 1 and 4) may be in fluid communication with a first exhaust manifold 36, and a second subset of engine cylinders e.g., cylinder 2 and 3) may be in fluid communication with a second exhaust manifold 38. While the present design is illustrated with respect to a 4-cylinder engine, it may be equally applicable to larger engines having different configurations, as mentioned above.

A controller 110 in communication with the engine 12 is configured to deactivate one or more cylinders that share a common exhaust manifold. The controller 110 may effectuate this deactivation by restricting fuel and air from entering or exiting the deactivated cylinder. In the example shown, cylinders 2 and 3 (sharing the second exhaust manifold 38) have been deactivated. As such, the only generated exhaust gasses are flowing through the first exhaust manifold 36.

The engine 12 may be in communication with a turbocharger 18 that includes both a dual-scroll turbine 50 and a single-sequential compressor 52. The dual-scroll turbine 50 may be operative to maintain a minimal power output despite the reduced exhaust gas flow 40. This is accomplished, in part, by separately channeling the exhaust gas 40 provided by the always-active cylinders, and the exhaust gas 40 provided by the selectively deactivatable cylinders. When the cylinders are deactivated, only the flow 40 through one of the two scrolls 66, 68 is affected. Moreover, the geometry of the turbine wheel 62 may account for the reduced overall flow by assuming a less aggressive pitch proximate the always-active scroll.

The single-sequential compressor 52 may provide the required increased boost pressure to achieve the required engine inlet flow by employing two parallel inlet flow paths 88, 90 leading to a single, dual-sided impeller 94. As such, the stall-point of the compressor 52 is shifted relative to the stall point of a single-flow compressor (i.e., the surge line is moved to achieve higher compression ratios at lower flow rates). This allows the compressor 52 to continue to provide the required increased boost pressure to the engine 12 when in a cylinder-deactivated state. Doing so may reduce turbine spool times when power is eventually requested and the deactivated cylinders are reactivated.

The dual-inlet, single-sequential compressor 52 further enables the engine 12 to operate in a cylinder deactivation mode for an extended amount of time to improve the average operating efficiency and fuel economy of the engine. More specifically, the use of cylinder deactivation mode is limited if a compressor is not capable of supplying the required flow of compressed air 92 or boost pressure to meet the engine demands (i.e., if the required boost pressure exceeds the surge limit of the compressor). In conventional designs, when this surge limit was reached, all cylinders would then be reactivated, which would increase the total air flow 92 through the engine 12 and reduce the boost pressure below the surge point.

In the present design, a single-sequential compressor 52 enables larger engine loads during cylinder deactivation by enabling higher boost pressures at lower air flow rates (i.e., air flow rates that may be experienced when less than all cylinders are active). If an increased torque load is requested, the compressor 52 needs to increase the boost pressure to produce the required amount of air flow 92 for the engine 12. This increased boost pressure can be significantly outside the boundaries or capabilities of typical single impellor compressors. The prior practice was to simply reactivate the deactivated cylinders once the single impellor surge limit was reached. This limitation resulted in a loss of engine efficiency by limiting the amount of time that the engine 12 could operate in cylinder deactivation mode. The present design uses a single-sequential compressor 52 to increase or shift the surge point of the compressor over that of traditional single compressors at low airflow 92, while maintaining turbocharger compressor performance at all other operating conditions. By increasing the potential for larger engine loads, the period of time that the engine operates in cylinder deactivation mode can be extended, which results in increased average engine operating efficiency.

Based on this disclosure, a method of operating a spark-ignited gasoline engine 12 includes providing a flow of compressed air from a single-sequential compressor 52 to a first subset of engine cylinders, selectively deactivating a second subset of engine cylinders, and igniting gasoline mixed with the compressed air in the first subset of cylinders. As described above, the single-sequential compressor 52 includes a dual sided impeller 94 that has a first blade arrangement 96 in fluid communication with a first air inlet 82, and an opposing second blade arrangement 98 in fluid communication with a second air inlet 84. Deactivating the second subset of engine cylinders includes sealing the second subset of cylinders such that the flow of compressed air is provided only to the first subset of cylinders.

In this method, the flow of compressed air provided to the engine 12 has a first boost pressure that is provided in response to a first load request. The load request may originate, for example, from a driver actuation of an accelerator pedal, though may be processed by the controller 110. Upon receipt of a second load request that is greater than the first load request, the single sequential compressor 52 increases the boost pressure of the compressed air above the first boost pressure. This increase in boost pressure may be accomplished by manipulating one or more air flow valves and/or waste gates associated with either the single sequential compressor 52 or the dual scroll turbine 50 to increase the airflow through the compressor 52 by driving the dual sided impeller 94 with greater speed via the shaft 54. In one embodiment, the single-sequential compressor 52 may operate during cylinder deactivation such that one of the first blade arrangement 96 and the second blade arrangement 98 of the dual sided impeller 94 provides greater than 50% of the air flow 92 (i.e., the low-flow blade arrangement). In other embodiments, the low-flow blade arrangement may provide greater than 60% of the air flow 92 or even greater than 70% of the air flow 92, or still even greater than 80% of the air flow 92. In these embodiments, the low-flow blade arrangement may be designed to efficiently accomplish higher boost pressures at lower flow rates, such as by utilizing a blade design and inlet area optimized for this operating mode. Conversely, during full engine operation (i.e., not during cylinder deactivation), the other blade arrangement may provide greater than 50% of the air flow 92, or greater than 60% of the air flow 92 or even greater than 70% of the air flow 92, or still even greater than 80% of the air flow 92 (i.e., the high-flow blade arrangement). In one configuration, the high-flow blade arrangement may have a particular blade design and inlet area optimized for this particular operating condition.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of operating a turbocharged gasoline engine including:
    a turbocharger having a single-sequential compressor being mechanically coupled to a twin scroll turbine,
        wherein the single-sequential compressor includes a single housing, a dual sided impeller having a first blade arrangement in fluid communication with a first air inlet, and an opposing second blade arrangement in fluid communication with a second air inlet, and an outlet in fluid communication with the first air inlet and the second air inlet;
        wherein the twin scroll turbine includes a first scroll and a second scroll;
    a first subset of cylinders in fluid communication with a second scroll of the twin scroll turbine via a second exhaust manifold,
    a second subset of cylinders in fluid communication with a first scroll of the twin scroll turbine via a first exhaust manifold,
    a controller in communication with the turbocharger, the method comprising:
        determining a load request during an engine operation via the controller, wherein the load request includes a first load request and a second load request;
        providing a flow of compressed air from a single-sequential compressor via the first air inlet and the second air inlet to the second subset of cylinders of the engine;
        selectively deactivating the first subset of cylinders, by restricting a fuel from entering, through fuel injectors, the first subset of cylinders upon receipt of a command from the controller, wherein deactivating includes sealing the first subset of cylinders such that the fuel is restricted from entering the first subset of cylinders while the flow of compressed air is provided only to the second subset of cylinders.

2. The method of claim 1,
    wherein the flow of compressed air has a first boost pressure that is provided in response to the first load request received by the controller, and the first load request originates from a driver actuation of an accelerator pedal, and the first load request is processed by the controller;
    wherein the method further comprises:
        receiving, by the controller, a second load request that is greater than the first load request, wherein the second load request originates from the driver actuation of the accelerator pedal; and
        increasing the boost pressure of the compressed air above the first boost pressure in response to the second load request, wherein the controller commands the single-sequential compressor to increase the boost pressure upon receipt of the second load request.

3. The method of claim 1, further comprising providing a supply of fresh air to each of the first air inlet and the second air inlet; and
    wherein the first air inlet and the second air inlet channel airflow to opposing sides of the dual-sided impeller.

4. The method of claim 1, wherein the single housing is a unitary, one-piece structure.

5. The method of claim 4, wherein the single-sequential compressor defines a volute passageway in fluid communication with the first air inlet and the second inlet and the volute passageway share a common wall.

* * * * *